United States Patent [19]

McDonald

[11] 4,086,999
[45] May 2, 1978

[54] CONVEYOR COMBINED WITH COUPLING FOR HANDLING WORKPIECE

[75] Inventor: David Ian McDonald, Cincinnati, Ohio

[73] Assignee: Cincinnati Milacron Inc., Cincinnati, Ohio

[21] Appl. No.: 796,847

[22] Filed: May 17, 1977

Related U.S. Application Data

[63] Continuation-in-part of Ser. No. 668,323, Mar. 18, 1976, abandoned.

[30] Foreign Application Priority Data

| Mar. 17, 1977 | France | 77 08019 |
| Mar. 17, 1977 | France | 77 08066 |
| Feb. 16, 1977 | Germany | 2706567 |
| Feb. 16, 1977 | United Kingdom | 046925/77 |
| Mar. 17, 1977 | Japan | 52-29727 |

[51] Int. Cl.² ............................................. B65G 47/90
[52] U.S. Cl. ..................................... 198/377; 198/651; 198/694; 214/1 BA; 294/93
[58] Field of Search ............... 198/377, 378, 477, 479, 198/482, 486, 651, 653, 678, 694, 695, 696, 344; 214/1 BA; 294/93, 94, 96, 86.24, 86.25

[56] References Cited

U.S. PATENT DOCUMENTS

| 2,988,396 | 6/1961 | Davies | 294/93 |
| 3,006,680 | 10/1961 | Gregory | 294/93 |
| 3,134,620 | 5/1964 | Blaisdell | 294/93 |
| 3,146,873 | 9/1964 | Johnson | 198/377 |
| 3,184,279 | 5/1965 | Shaffer, Jr. | 198/377 |
| 3,722,710 | 3/1973 | Ixer et al. | 214/1 BA |
| 3,829,147 | 8/1974 | Ryswick | 294/93 |
| 3,885,825 | 5/1975 | Amberg et al. | 198/653 |
| 3,944,058 | 3/1976 | Strauss | 294/116 |
| 3,945,486 | 3/1976 | Cooper | 198/651 |
| 3,958,685 | 3/1976 | McDonald et al. | 198/654 |

*Primary Examiner*—Bruce H. Stoner, Jr.
*Assistant Examiner*—Richard K. Thomson
*Attorney, Agent, or Firm*—Daniel P. Worth

[57] ABSTRACT

A coupling includes an outer cup-shaped member which acts as a support for other portions of the coupling and which itself is revolvably supported on a conveyor that moves the coupling between workpiece loading and unloading stations. The outer cup-shaped member acts as a shield against ambient conditions which may include heating, coating or other processing means. One embodiment of the invention has a plurality of fingers mounted to move radially inward of the coupling to grasp the workpiece, which fingers are mounted to form a part of the outer shield or wall at the time that they are grasping a workpiece. Another embodiment of the invention involves an internal chuck sort of coupling using an expandable resilient member which can be an elastomeric ring to expand outwardly into a grasping relationship with a hollow portion of the workpiece. The coupling and conveyor are suited for use in handling soft or easily marked materials such as plastic, soft metals and the like.

11 Claims, 20 Drawing Figures

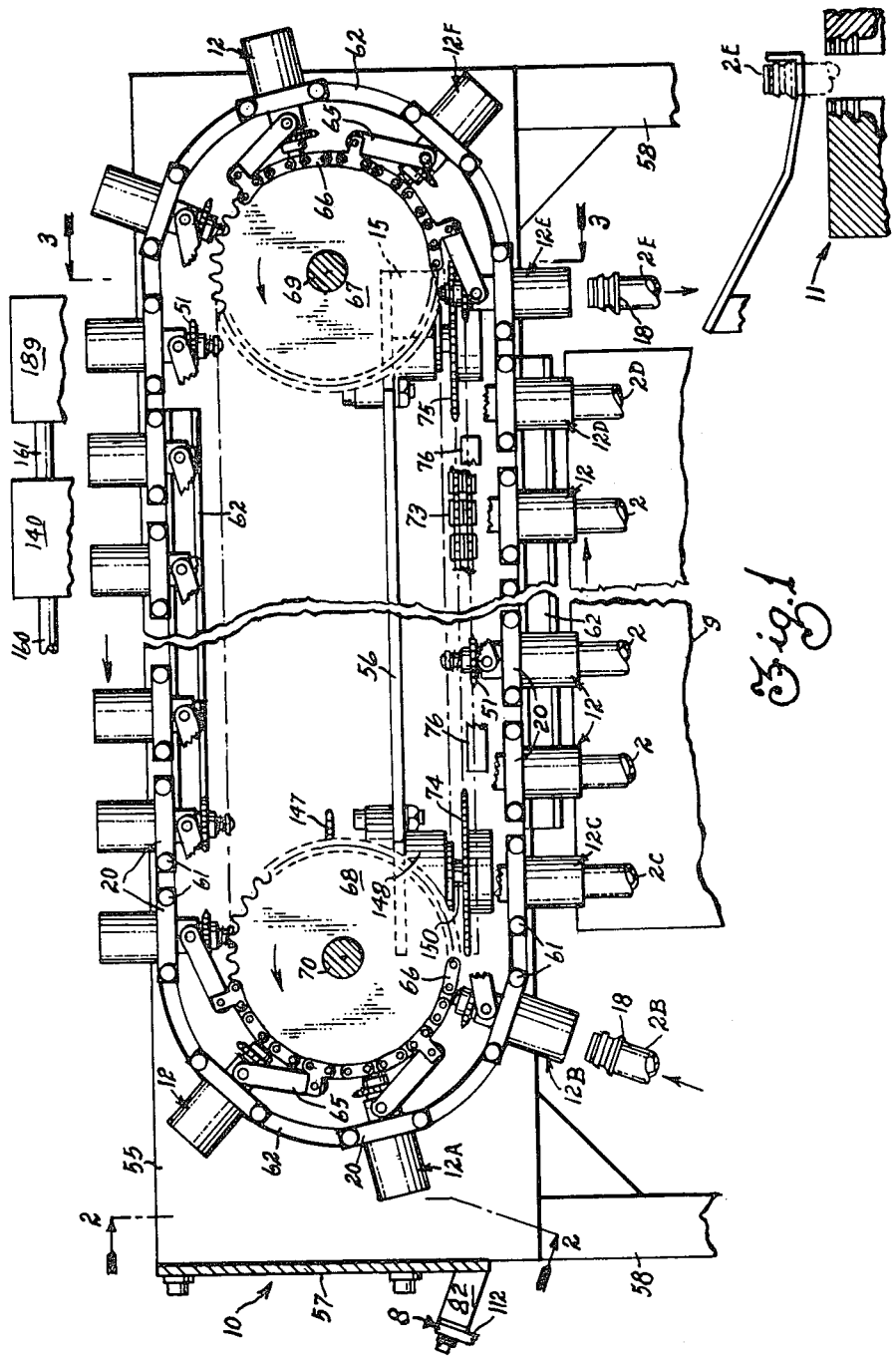

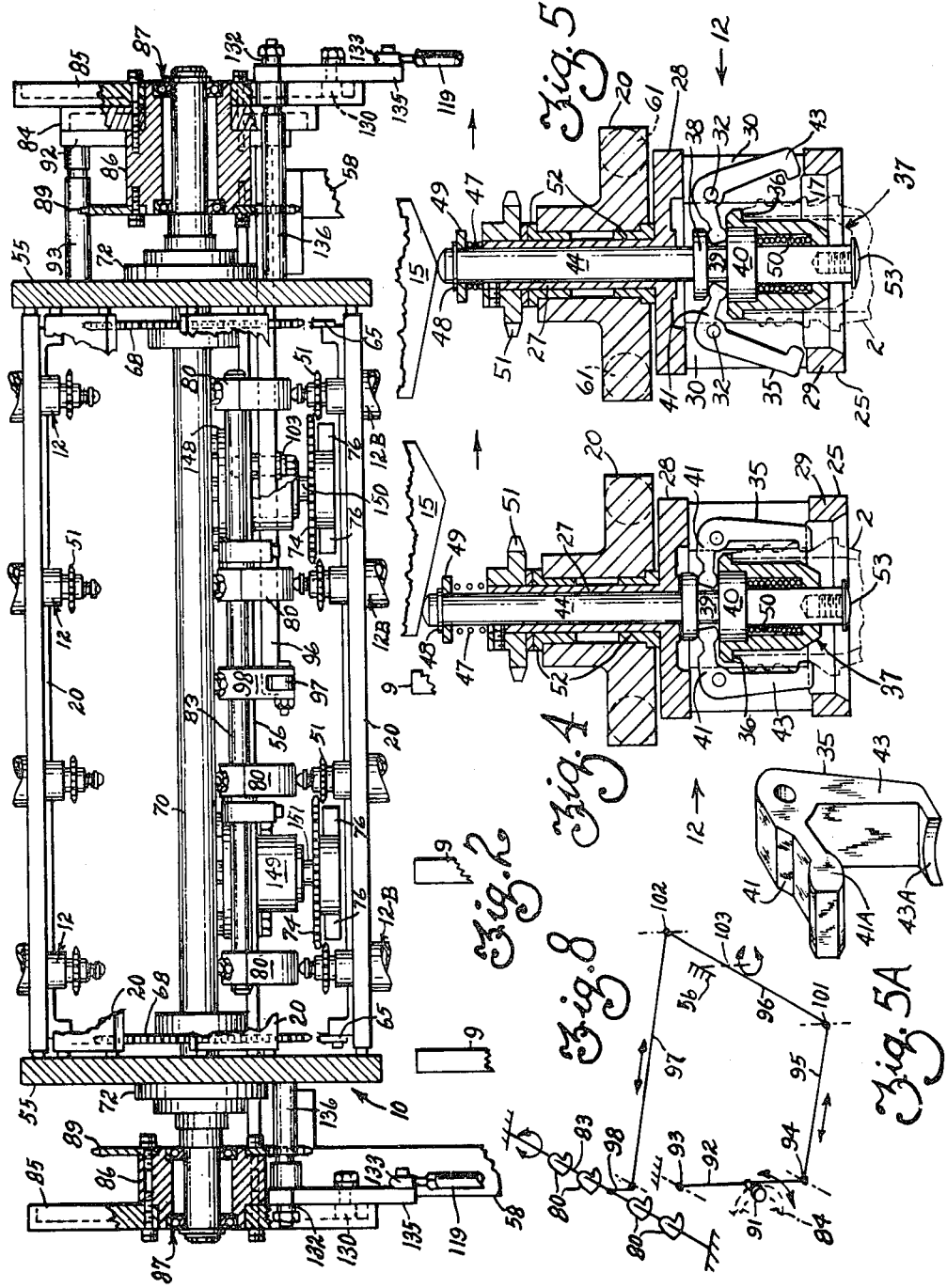

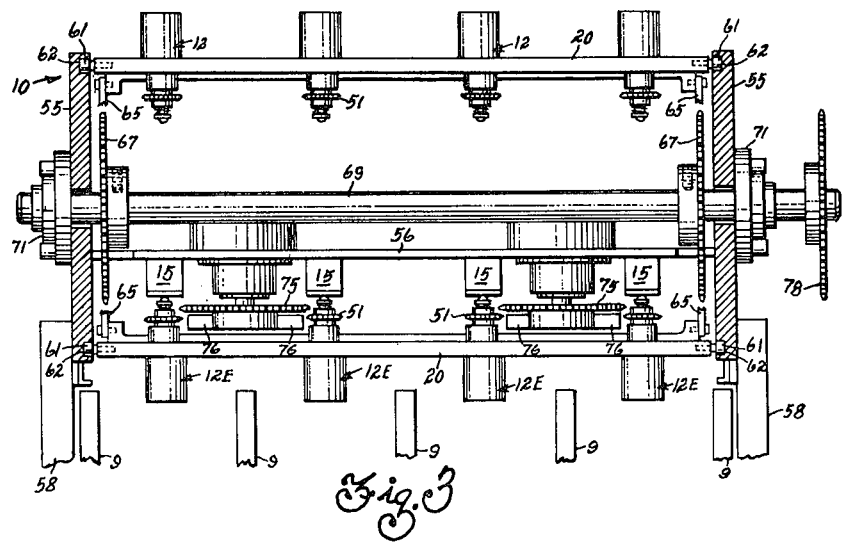
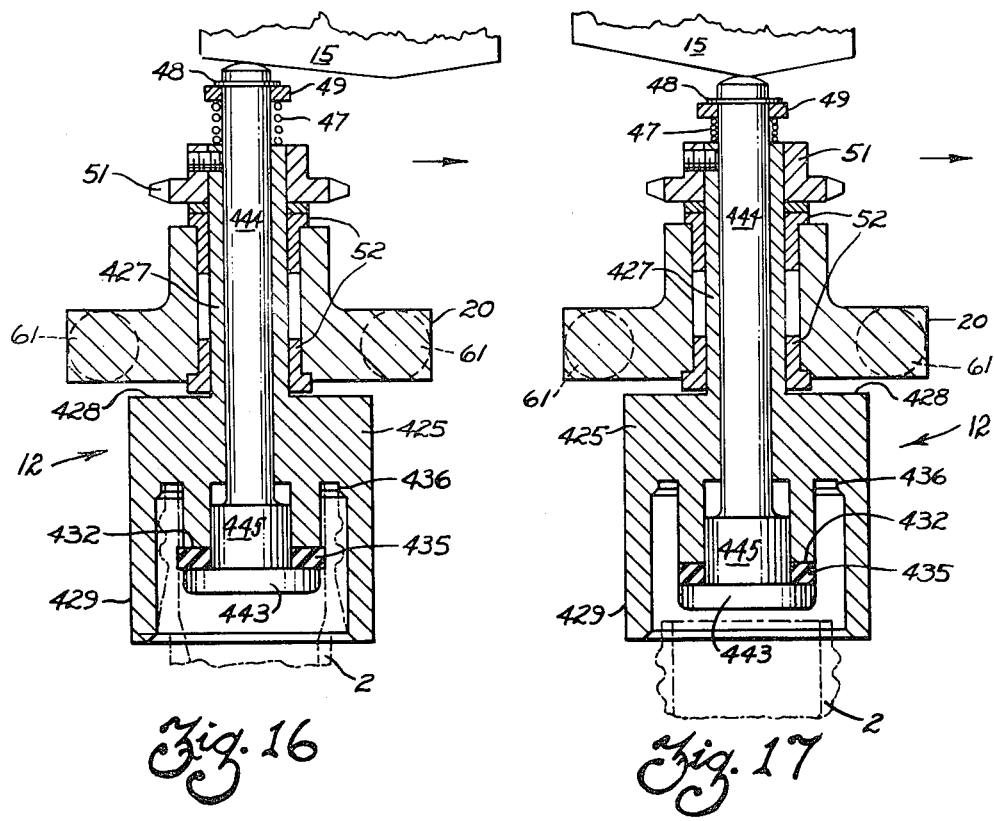

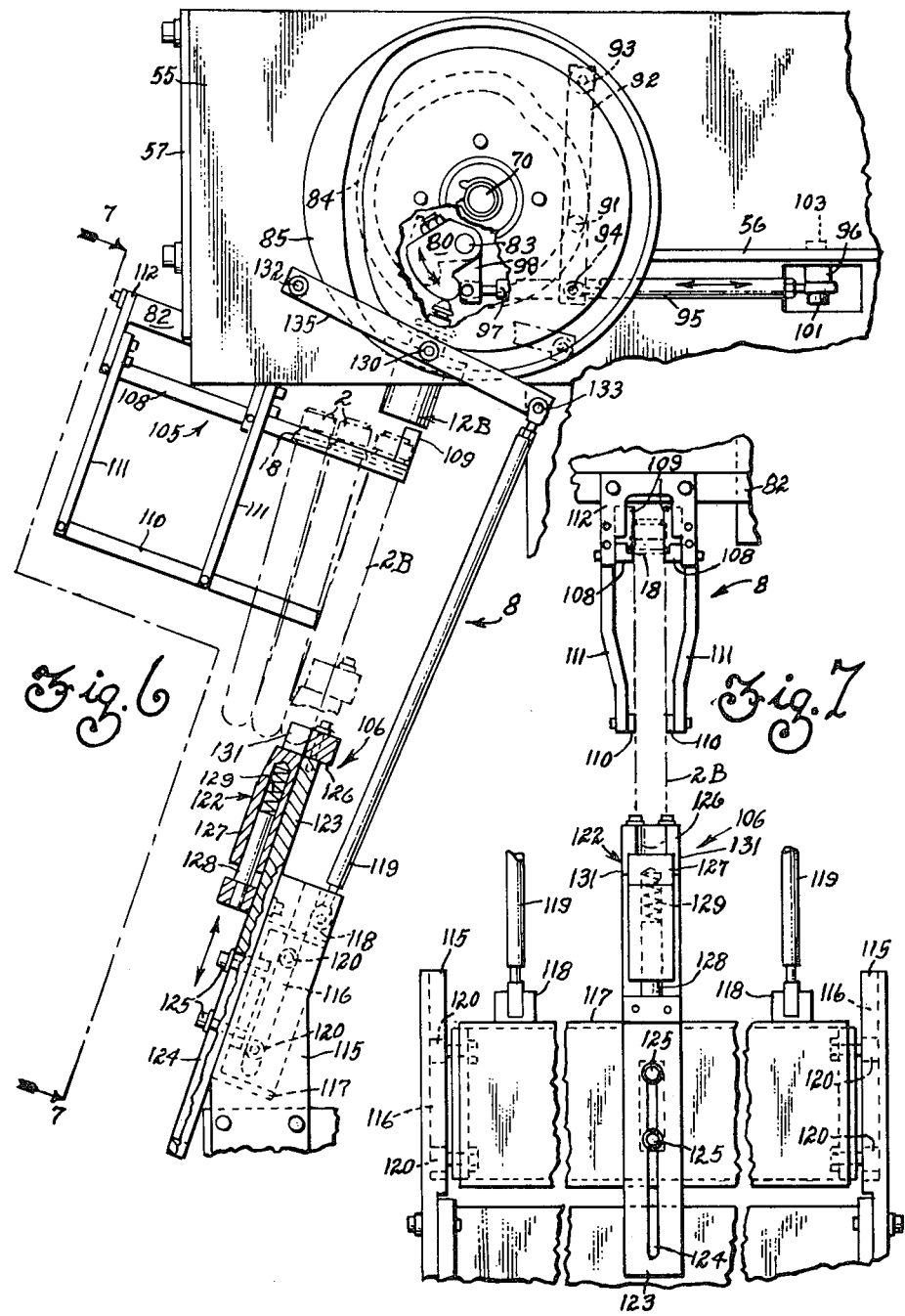

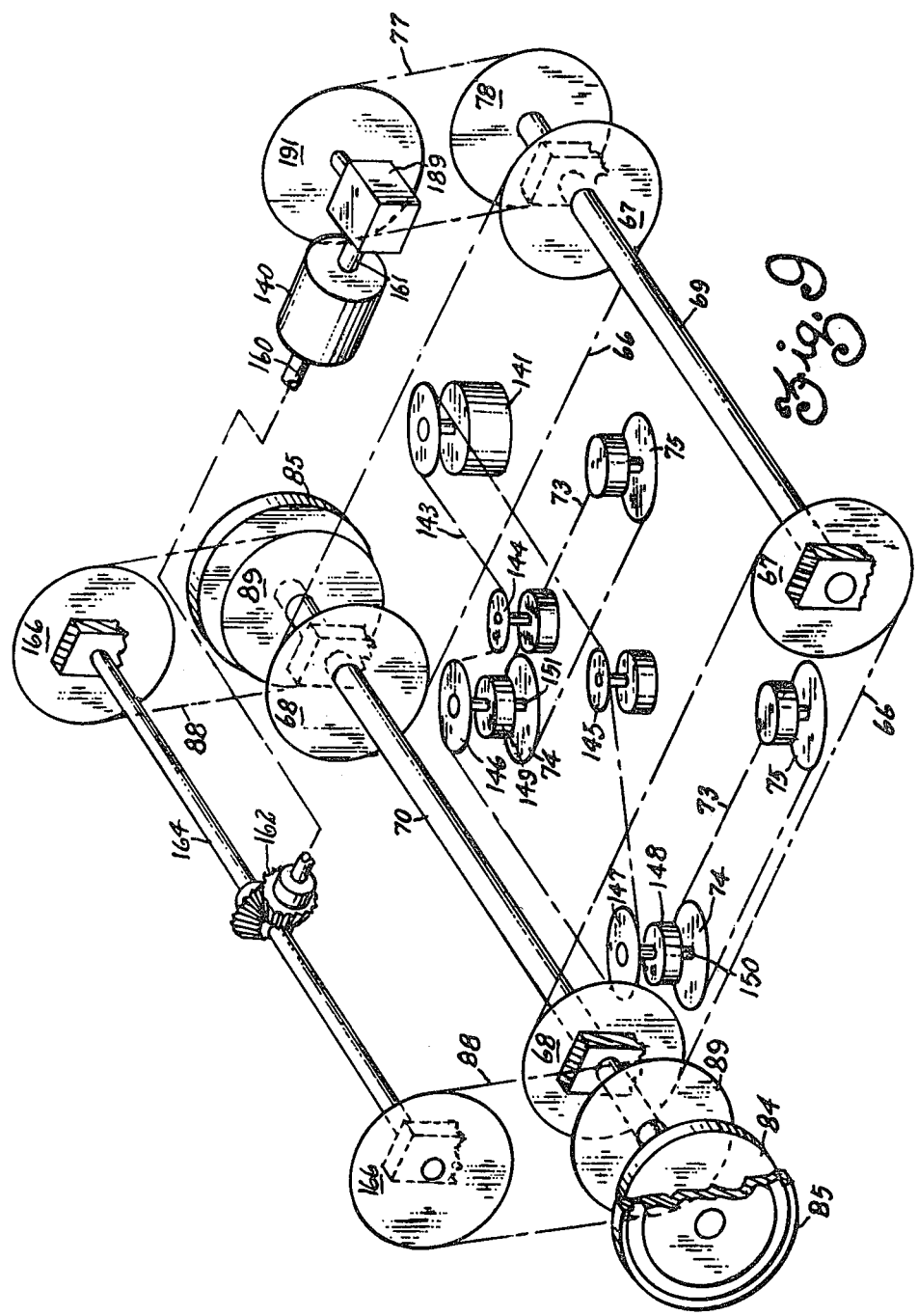

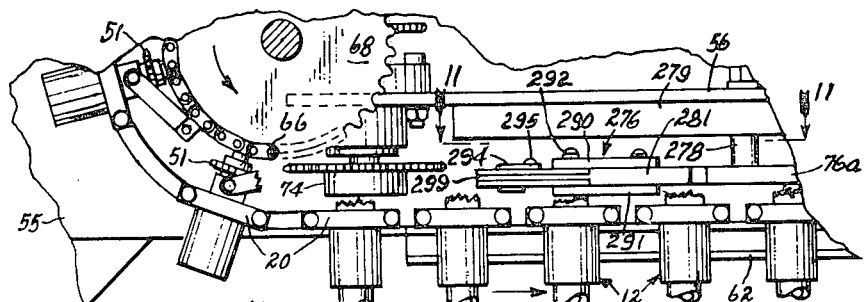
Fig. 10
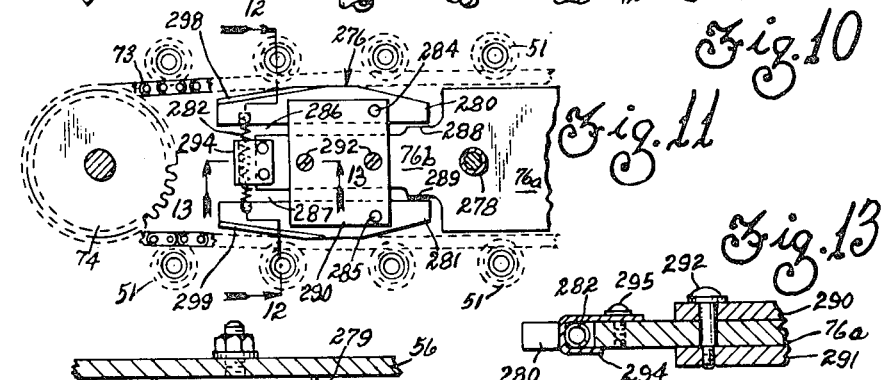
Fig. 11
Fig. 13
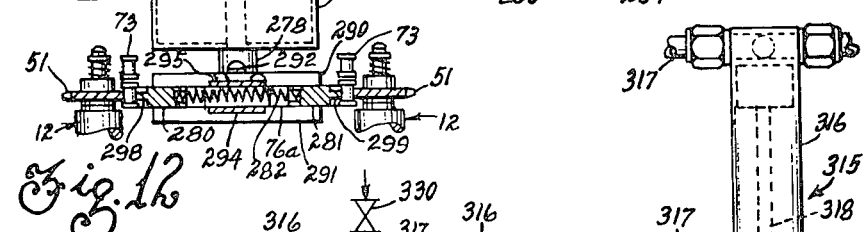
Fig. 12
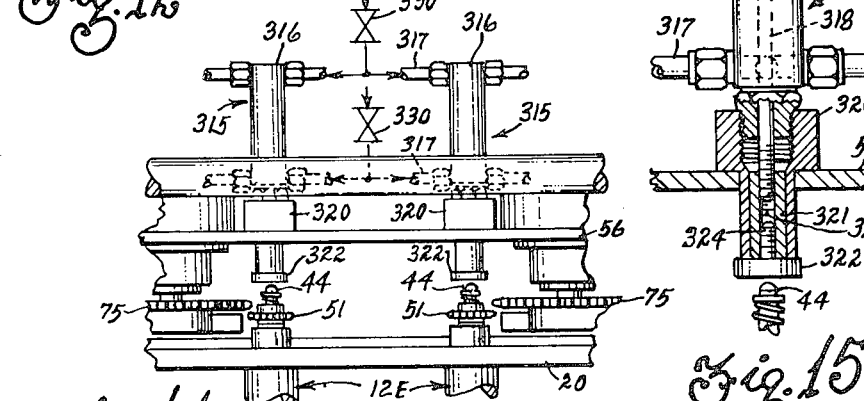
Fig. 14
Fig. 15

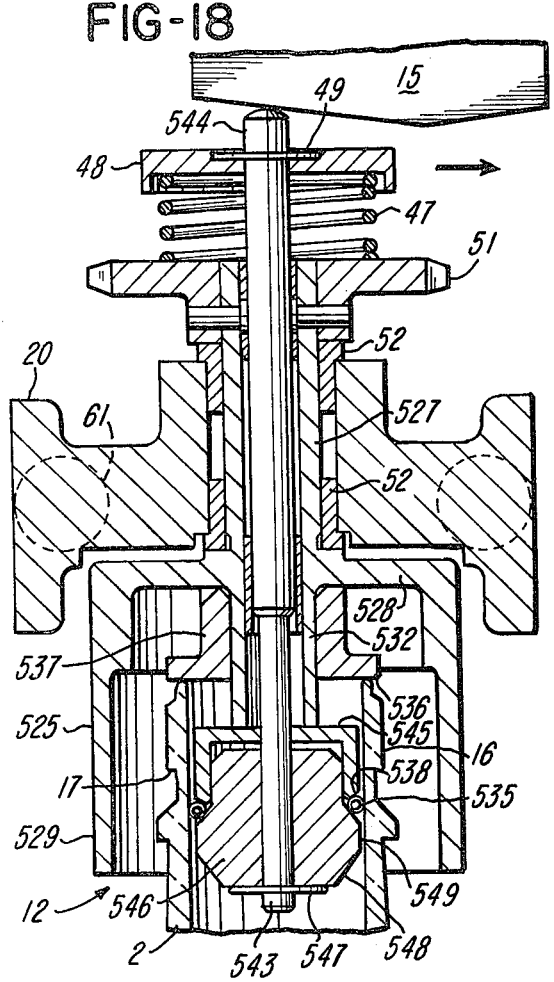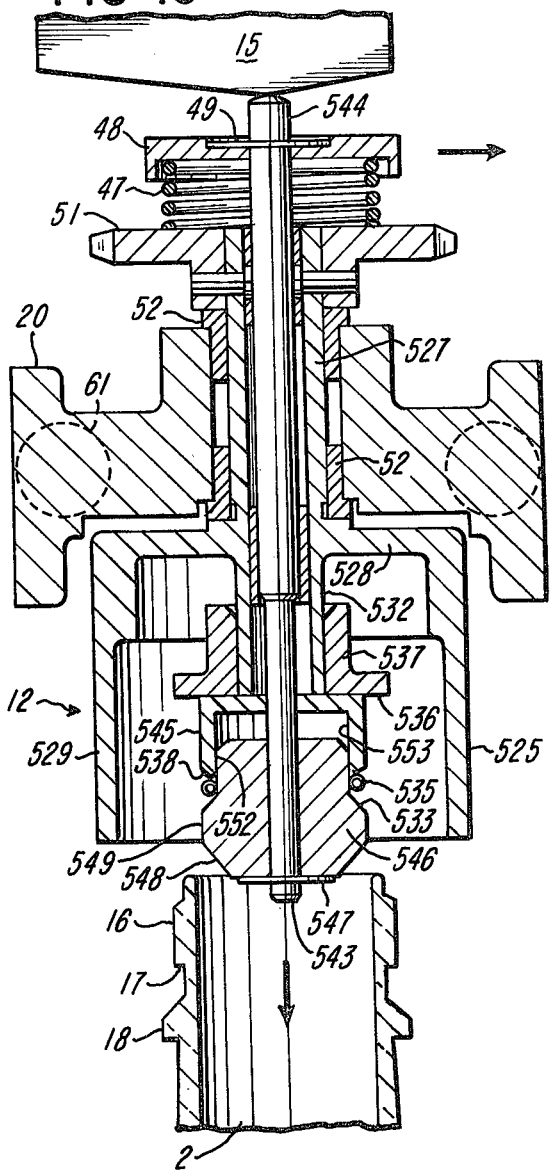

CONVEYOR COMBINED WITH COUPLING FOR HANDLING WORKPIECE

SUMMARY AND BACKGROUND OF THE INVENTION

This application is a continuation-in-part of my co-pending application Ser. No. 668,323 filed Mar. 18, 1976 now abandoned and entitled Conveyor Combined With Coupling For Handling Workpieces which co-pending application was in turn copending with an earlier application Ser. No. 475,620 filed June 3, 1974, now U.S. Pat. No. 3,958,685 on which I am a co-inventor and which has the same assignee as the present application and which is to the extent permissible expressly incorporated herein by reference.

The present invention relates to an improved coupling having a radially moving member combined with a conveyor means. One aspect of the invention is an external chuck in such combination. An aspect of the invention is an internal chuck in such combination. An aspect of the invention is an improved conveyor and coupling combination for handling one or more workpieces of soft or easily marred material such as workpieces of thermoplastic resin in connection with which the invention will be described.

The invention for purposes of illustration but not limitation will be described in connection with the aforesaid means for handling workpieces comprising injection molded thermoplastic preforms that are being reheated to a carefully controlled temperature immediately prior to being blow molded into a bottle with a threaded neck for closure by a threaded closure. The preform ordinarily has a circular cross-section and the parts of the coupling engaging the preform likewise have a circular cross-section. The mechanism of interest holds the workpiece by the neck during a reheating in a substantially vertical position depending from the mechanism and twirls the workpiece.

Blow molding is used to manufacture hollow articles such as bottles, jars and other containers from various plastics and resins such as polyethylene, polypropylene, polyvinyl chloride, polyacrylonitrile, polyethylene terephthalate and the like.

The present invention provides means for conveying a preform through a reheating operation of the sort just described and delivering it to a blow molding means. The present invention therefore is intended to convey the preforms througb an oven to be heated in a uniform manner. The present invention accomplishes this by engaging the preform in the region of its neck and moving it through the oven by a series of periodic linear advancements between the loading and unloading stations while continuously rotating the preforms. As a matter of convenience, I refer to the preform engaging means as a coupling or collet.

Other objects, advantages and features of the invention will become apparent from a reading of the following disclosure in conjunction with the annexed drawings wherein:

FIG. 1 is a side view with side plate removed and in partial section showing a conveyor combined with plurality of couplings and with workpieces, e.g., preforms, engaged by couplings:

FIG. 2 is a end view with partial section along 2—2 of FIG. 1 showing rocking cams for loading the coupling, coupling rotator, face cams for preform (workpiece) timed feeding, and a bearing and sprocket arrangement on a shaft common to both continuous and intermittent rotation;

FIG. 3 is an end view at the release or discharge end of the machine in with partial section along 3—3 of FIG. 1 showing the coupling rotator, release can, conveyor track and follower, and part of intermittent drive;

FIGS. 4 and 5 are enlarged side cross-sections of an external coupling on a carrier bar and release cam in, respectively, a workpiece engaging or holding position and a workpiece releasing or loading position;

FIG. 5A is an isometric view of the bell crank of FIGS. 4, 5;

FIG. 6 is a side view from the right hand side in partial section of the loading end of the conveyor of FIGS. 1 and 2 with the side plate on and with other details omitted for clarity showing a workpiece loading means for presenting workpieces one at a time to each coupling;

FIG. 7 is a end view along 7—7 of FIG. 6 of one of several workpiece loading means it being understood the other such means are constructed in like manner;

FIGS. 8 and 9 are isometric schematic diagrams, respectively, of the linkage that operates the rocker cam of FIG. 2 and of the conveyor power trains one of which provides both continuous and intermittent motion; and FIGS. 10, 11, 12 and 13, respectively, are side, top, and enlarged end and side views in partial section of a modified preferred embodiment of the pressure plate for the lower half of the coupling drive chain;

FIGS. 14 and 15, respectively, are end and enlarged side views in partial section of a modified preferred embodiment of the release cam means;

FIGS. 16 and 17 are enlarged side cross-sections of an internal chuck or coupling having a resilient elastomeric ring on a carrier bar and a release cam in, respectively, a workpiece engaging or holding position and a workpiece releasing or loading position; and FIGS. 18 and 19 are enlarged side cross-sections of an internal chuck or coupling on a carrier bar in, respectively, a workpiece engagement and a workpiece releasing position, which chuck has a resilient garter spring member.

GENERAL

For purpose of illustration, a preferred embodiment of the invention will be described which is useful for conveying preforms 2 of polyethylene teraphthalate shaped as shown in FIGS. 4, 5 and 6 from the loading means 8 of FIGS. 6 and 7 through a oven 9 while heating the same to a predetermined condition (FIGS. 1, 2 and 3) using the conveyor 10 of FIGS. 1, 2 and 3 and then to release the preform by appropriate means (FIGS. 3, 5, 17, 19) for direction to a blow molding means 11 of any conventional type. Inasmuch as the oven and blow molding means are not part of this invention, no further description of either will be given. The workpiece 2 is held or engaged by a coupling 12 constructed as in FIGS. 4, 5 or 16–18 from the time it is loaded by the loading assembly of FIGS. 6 and 7 until it is released at the other end of the conveyor by release cam means 15 further described with respect to FIGS. 3 and 5. The coupling is continuously rotated during the time it passes through the oven 9 to achieve a uniform application of intense heat, hence a uniform temperature. The conveyor itself has an array of couplings 12 and alternately advances and stops (i.e. stop and go advancement) the couplings periodically so that loading by the assembly 8 (FIGS. 6, 7) takes place during those times the couplings 12 are not advancing even though some of them may be rotating.

The workpiece being handled preferably has a shaped portion contoured for engagement and most preferably has a head on top of a long body so that the coupling detents can engage and hold under the head: for present purposes it is assumed to be a preform of soft plastic material shaped generally like a test tube with a threaded lip 16 (FIGS. 4, 5, 6) for use in blowing a bottle. Such a preform due to, inter alia, the extreme stresses to which it will be subjected during blowing, filling, and capping has a neck construction comprising an externally threaded lip 16 superimposed immediately above a pilfer proof ring 17, which is spaced closely above a support ring 18. The pilfer proof ring and threads are of course used in connection with filling and capping the ultimate container. The preform and the bottle made from the preform is hung from the support ring 18 during many manufacturing operations, in the manner shown in FIGS. 6 and 7, for example.

Injection molded preforms are loaded by hand or by some appropriate loading device into the loading assembly 8 of FIGS. 6 and 7 which is connected to the left end of the FIG. 1 conveyor. This loading assembly is operated in timed relationship to the movement of the conveyor 10 and of each individual coupling 12 whereby each preform is fed to the coupling while the latter is temporarily held in the load position (reference 12B) in FIGS. 1 and 6. The coupling parts are during loading held in the open (release) position of FIG. 5 until the workpiece is seated after which the coupling is closed, i.e. moved to the engaged or holding position of FIG. 4. Once the workpiece or preform has been thus loaded in the coupling 12B the conveyor once again resumes its advance whereupon each loaded coupling (e.g. 12C - 12D) is continuously rotated while being moved from position to position in a periodic fashion through the oven and to the point of release 12E shown at the right side of FIG. 1 and in FIGS. 3 and 5.

As should be apparent from viewing the drawings, especially FIGS. 1-3, an array of couplings is presented in a rank and file fashion. The illustrated embodiment (FIGS. 2, 3) shows a plurality of couplings ranked four abreast on a carrier bar 20 whereby these four are able to move in unison through all operations to simultaneously deliver four preforms to the blow mold 11. Also, as shown best in FIG. 1, the couplings are likewise arranged in a file fashion, that is, one behind the other, so that the loaded couplings are able to move under the motive power supplied by the conveyor from the loading station 8 through the oven 9 to the release point 12E (adjacent a chute to blow molds 11 which is illustrated without the usual vertical spacing due to space limitations) and the empty couplings then return to the loading station and so forth repeatedly.

The conveyor 10 provides appropriate means for causing the continuous rotation of each loaded coupling while at the same time providing for intermittent advancement of the coupling from the loading to the unloading end of the machine.

Coupling or Collet, FIGS. 4, 5

The preferred embodiment of the collet or coupling 12 to be used in the present invention is illustrated in cross-section in FIGS. 4 and 5. FIG. 4 illustrates the position of the various coupling parts when a preform or other workpiece is engaged or held by the coupling or when the coupling is empty and being returned for reloading. FIG. 5 illustrates the relative position of the parts when the coupling is empty and being returned for reloading. FIG. 5 illustrates the relative position of the parts when the coupling is releasing or receiving a workpiece. FIGS. 16, 17 illustrate an alternative embodiment of the coupling of an internal or expanding chuck type. Both of these embodiments preferably are circular in cross-section, provide a structure to shield the bottle preform neck from heat, to grip the preform by its neck, to permit twirling or rotating the preform, and to hold the preform in a substantially vertical position depending from the embodiment being used while conveying the preform through a process, most likely a heating — rather reheating — process.

The coupling 12 engages and releases the preform responsive to relative motion between its several parts, which motion converts axial to radial motion. The coupling comprises a first cup-shaped member 25 which is the outermost member and forms a support from which a hollow stem 27 rises upwardly. Cup 25 has a closed end 28 from which the hollow stem 27 arises and a tubular, preferably cylindrical wall 29.

Thus, the present invention will be seen to include collet or couplings in combination with conveyor means to form a machine that carries a workpiece substantially vertical while twirling. The collet or coupling includes a radially moving detent member selected from the group consisting of an elastomeric ring 435 (having a volume such that axial compression can expand it into internal engagement with the workpiece) and a bell crank 35 (preferably an opposed pair each having a radially movable arm for grasping the workpiece externally).

The depending cylindrical wall 29 has a pair of diametrically opposed windows 30 therethrough. Mounted in each window to pivot about a pin 32 is a bell crank (also called herein a finger or detent) 35 which is actuated by means to be described below in such a way as to grasp and to release the workpiece. Detent 35 has a crank arm 41 and a grasping arm 43. Preferably, the bell crank grasps the workpiece on the underside of the anipilfering ring 17, the slope of which is such that inward radially motion of the detent grasping arm 43 drives the upper end to lift the preform firmly against the lower face of flange 36 part of ejector 37 and which is the preform seat and is retained in the upper end of the cup 25 in the position shown in FIG. 4 with the spring 50 at least partly compressed. The top face of seat flange 36 is substantially aligned with the shoulder or face on the bottom retaining ring 40 that forms the detent actuating groove 39 with the lower face of an upper ring 38. Rings 38, 40 and groove 39 are integral with the follower 44.

Each bell crank or detent 35 is preferably constructed as in FIG. 5A and has a crank arm 41 with a follower surface 41A on its outboard end that engages the two faces forming the groove 39. The detent also has a grasping arm 43 on the end of which is a contoured grasping surface 43A for wedging the preform up against the seat 36 as mentioned above. A follower 44 is revolvably and reciprocably mounted within the stem 27. The shoulders or rings 38, 40 defining the groove 39 are preferably integral with follower 44 and are positioned as shown in FIGS. 4 and 5 to cooperate with the detents 35 and swing the detents 35, i.e. the grasping arm 43 and its surface 43A, clear of any grasping position with the preform when the follower is fully depressed (FIG. 5) and swing the detent 35 into full engagement with the preform when the follower is in its preform-engaged or loaded position as in FIG. 4. In this way, axial motion of the follower 44 causes the detents to swing and move the grasping arm 43 radially to the extent need to engage the preform (FIG. 4) or to release the preform as in FIG. 5.

In a manner similar to the construction of the follower and carrier connection of co-pending U.S. application Ser. No. 475,620 now U.S. Letters Pat. No. 3,958,685, referred to above, follower 44 has resilient biasing means 47 preferably a helical holding spring compressed between the stem 27 and a retaining ring and washer 48, 49 secured to the upper end of the follower, to thereby bias the lower end of the follower and the seat 36 to within the cup 25, i.e biasing the parts into the relative positions shown in FIG. 4.

A second resilient biasing means is provided as seat spring 50 between the follower ring 40 and the workpiece seat 36. The seat 36 is arranged to slide axially on the follower to the position of facial alignment above and is secured on the lower end of the follower by a screw 53. The spring 50 urges the seat against the screw 53.

As also noted in the aforesaid co-pending application, there is secured to the upper end of the stem a sprocket or gear 51 for causing the coupling to rotate continuously about an axis through the coupling when the same is combined with the conveyor. The support stem 27 is mounted revolvably to the carrier bar by a pair of journal bearings 52 which preferably comprise permanently lubricated bushing type insert bearings that are readily obtainable commercial items.

Each coupling 12 constructed according to FIGS. 4 and 5 operates thus: the workpiece 2 is initially loaded in or is released by depressing the follower 44 which compresses the holding spring 47 and moves the seat 36 groove 39 axially down toward the FIG. 5 position whereupon the ejection assisting means of the seat 36 and spring 50 operate so that the seat spring 50 urges the seat 36 down to where the screw 53 stops further seat movement: responsive to these actions the grasping arms 43 of each detent 35 is radially moved out into its window aperture 30. Thereby releasing the workpiece. The parts at this time reach the FIG. 5 position and if a workpiece is in the coupling at beginning, it is released but if the coupling is empty it is loaded by inserting a workpiece 2 and moving it axially until the detents 35 engage it by ultimately assuming the FIG. 4 position. The holding function proceeds in substantially the reverse order of the steps first recited and the detents 35 upon swinging back through the windows 30 become fully engaged with the preform. Thus, relative axial motion between the follower and cup 44, 25 is converted into radial motion of the detents 35.

Coupling or Collet of FIG. 16 and 17

This embodiment of the coupling 12 is illustrated in cross-section in FIGS. 16 and 17 which respecively illustrate the position of the various coupling parts when a preform is engaged or held by the coupling and (FIG. 17) the relative position of the parts when the coupling is releasing a workpiece or receiving a workpiece.

Part numbers for similar parts of FIGS. 16, 17 are as used in the co-pending application and in the description of FIGS. 4 and 5 above, with the addition of a prefix in the 400 series, e.g. the follower is 444 and the cup is 425, Identical parts or assemblies continue to have the indentical number as given above, e.g. carrier bar 20, carrier rollers 61, drive gear 51 and cam 15.

The coupling assembly 12 engages and releases the preform in a manner similar to that described which converts axial motion to radial motion. The present embodiment uses an internal chuck principal and preferably operates by axially compressing and decompressing an elastomeric member (detent 435) to cause it to increase in diameter or decrease in diameter, as the case may be, to engage and disengage the preform on the internal diameter of the preform neck.

The coupling 12 comprises a first cup-shaped member 425 which is the outermost member and forms a support from which a hollow stem 427 rises upwardly. Cup 425 has a closed end 428 supporting the hollow stem from which the skirt or preferably a tubular cylindrical wall 429 depends. The internal wall of the skirt 429 at its lowermost point has a beveled edge to act as a lead in or guide for the preform and to its position during loading.

The uppermost end 436 of the chamber defined by the end 428 and skirt 429 is shaped or conformed to receive and seat the upper end of the preform or workpiece which as already mentioned is of a hollow annular shape. The loading procedure sees to it the preform is pushed far enough into the chamber and seats thereat 436 (FIG. 16).

An annular cam surface 432 depends from this upper end and is positioned to be inside of the workpiece annulus, i.e. it enters within the internal diameter of the preform neck as illustrated in both FIGS. 4 and 5. This depending wall is annular in shape and acts as an anvil against which the elastomeric member, detent 435, is compressed. Detent 435 is an annular ring of medium soft rubber (about e.g. 25A shore hardness) compounded to resist temperatures in the range of at least 300° F and to resist abrasion.

Follower 44 is slidably mounted in the hollow stem 427, has a guide shoulder 445 which engages the inside diameter of annulus 432. The lower end 443 of follower 444 is T-shaped and in cross-section resembles that of a nail or a screw. The underside of the head 443 of this "nail" acts as the moving element or hammer which causes the elastomeric ring 435 to be expanded and compressed responsive to axial motion of the follower.

Each coupling 12 made according to FIGS. 16 and 17 operates thus: the workpiece 2 is initially loaded in or is released by depressing the follower 444 which compresses the holding spring 47 and moves the follower end 443 axially down toward the FIG. 17 position whereupon the detent 435 is allowed to and does radially contract or move radially inward thereby releasing the workpiece or presents a diameter readily insertable into the hollow parison neck. The parts at this time reach the FIG. 17 position and if a workpiece 2 is in the coupling 12 at beginning, it is released but if the coupling is empty it is loaded by inserting a workpiece 2 and moving it axially until the detents 435 engage it by ultimately assuming the FIG. 16 position. The holding function proceeds in substantially the reverse order of the steps first recited whereupon detent 435 expands radially to become fully engaged with the internal diameter of the preform. Thus, relative axial motion between the follower and cup 444, 425 is converted into radial motion of the detent 435.

Embodiments of FIGS. 18 and 19

The embodiment of FIGS. 18 and 19 differ from the foregoing in having a garter spring 535 as the resilient member which expands into engagement with the inside of the preform neck.

Part numbers for similar parts of FIGS. 18 and 19 are as used in the other embodiments with the addition of a prefix in the 500 series, e.g. the follower is 544 and the cup is 525. Identical part or assemblies continue to have the identical number as above or in the issued U.S. Pat. No. 3,958,685, e.g. carrier bar 20, carrier rollers 61, etc.

The coupling assembly 12 engages and releases the preform in a manner similar to that described for the embodiment of FIGS. 16 and 17, namely by a means for converting axial motion of the follower 544 to radial motion of an engaging member, here specifically to expand the resilient detent means 535 which is preferably a garter spring. Thus, the present embodiment operates similar to an internal chuck by axial compression and decompression of the resilient detent garter spring 535 to cause it to increase in diameter or decrease in diameter, as the case may be, to correspondingly engage and disengage the preform on its internal diameter.

Coupling 12 comprises a first cup-shaped member 525 which is the outermost member and forms the support from which a hollow stem 527 rises upwardly. Cup 525 has a closed-end 528 supporting the hollow stem from which a skirt or tubular cylindrical wall 529 depends. The skirt depends far enough to act as a heat shield to protect the neck of the preform from the surrounding heating affects. The reason for this is to prevent distortion of the neck which must be maintained in a more or less exact dimension so that a closure can be applied thereto at a later point.

The preform is placed in the same position each time by seating it against preform seat 536 which is the lowermost face on the flanged bushing 537 that is slidably mounted on the depending internal annular shoulder 532. Abutting on shoulder 532 is a garter spring upper seat 545 which is a small cup-shaped member preferably formed with a tapered lower lip 538 and is slidably fitted on the lower end of the follower. Seat 545 has an outer diameter sufficient to guide the preform while the same is being moved in and out of engagement with the coupling and the cup bottom is in facial engagement with said shoulder and — in the FIG. 19 — with the seat 536. This tapered lip 538 is annular, has a taper that converges toward the open end of the chamber and acts as a wedge and anvil against which the resilient detent spring 535 is compressed and expanded by cam surfaces on nose 546.

Follower 544 is slidably mounted in the hollow stem 527 and has a lower end on which is slidably mounted the spring expanding nose 546. This nose is fitted slidably on the lowermost end of the follower and held there by a pin or retainer ring 547. The nose is circular in cross-section as are the other components of this coupling, has a tapered lowermost end 548 to guide the preform as it is loaded thereon, a cylindrical guide band 549 adjacent thereto and then a tapered spring expanding surface or cam surface 533. There is also a smaller diameter cylindrical surface 552 that slidably engages the interior of inverted cup 545 so that the two cooperate readily.

Each coupling 12 made accordance to FIGS. 18 and 19 operates thus: the workpiece 2 is initially loaded in or is released by depressing the follower 544 which compresses the holding spring 47 and moves the follower end 543 axially down toward the FIG. 19 position whereupon the detent 535 is allowed to and does radially contract or move radially inward thereby releasing the workpiece or presents a diameter readily insertable into the hollow parison neck. The parts at this time reach the FIG. 19 position and if a workpiece 2 is in the coupling 12 at beginning, it is released but if the coupling is empty it is loaded by inserting a workpiece 2 and moving it axially until the detents 535 engage it by ultimately assuming the FIG. 18 position. The holding function proceeds in substantially the reverse order of the steps first recited whereupon detent 535 expands radially to become fully engaged with the internal diameter of the preform as in FIG. 18. Thus, relative axial motion between the follower and cup 544, 525 is converted into radial motion of the detent 535.

Conveyor Assembly

The conveyor assembly 10 provides the machine frame or base on which the entire system is mounted. The base includes a pair of conveyor side plates 55 (FIGS. 1, 2 and 3) spaced apart by a horizontal frame plate 56 and connected at one end by a vertical end plate 57 and mounted on legs 58 a suitable height above the floor. The various frame members constitute a support assembly from which a variety of bearings, prime movers, and guide members are supported.

The couplings 12 are arranged four abreast across the conveyor in the carrier bar. Each carrier bar 20 is supported at each end by a pair of rollers 61 — conveniently cam follower rollers — from a side frame track 62 which advantageously may comprise a groove machined in the side plates. It is preferred to reduce machining, however, so it may be an advantage to bolt angle or channel irons to the side plate for use as carrier bar track in the horizontal straight portions and to only machine a semi-circular groove therefor at the ends (as viewed in FIG. 1) of the respective side plates.

Each carrier bar 20 is connected by a drag link 65 at each end to a conveyor chain 66 on each side of the conveyor. The conveyor chain in turn is wound around the drive and idler sprockets 67, 68 which are respectively mounted on drive shaft 69 and idler shaft 70. The drive shaft 69 is supported between the side plates 55 (FIG. 3) on bearings 71. The idler shaft 70 is supported in bearings 72 from the respective side plates. Note that each end of each carrier bar 20 is supported on a track 62 and has a drag link 65. Among other things this eliminates malfunctions from the carrier bar cocking as might be the case were they single point connection.

The couplings 112 are caused to rotate continuously by a horizontally disposed double width or double link chain 73, the lower half of which engages the coupling sprockets 51 and the upper half of which is wound around a coupling drive sprocket 74 and coupling idler sprocket 75. The use of the double width chain 73 and placing the coupling sprocket 74 at a vertically lower level or plane than the drive and idler sprockets eliminates mechanical interference that might occur if they were at the same level while at the same time permitting each coupling to begin rotation earlier and end it later in its course of travel from the loading to the unloading stations. A pressure plate 76 (a modified embodiment of which that is preferred being described relative to FIGS. 10—13) is supported to engage the backside of both the tight and slack side of the chain 73 to assure maintenance of driving contact between the chain 73 and the respective coupling sprockets 51. As best seen in FIGS. 2 and 3, both the tight and slack sides of each chain are engaged by a plurality of sprocket couplings. Moreover, by placing the coupling chains 73, their drive gear 74, 75 and pressure plate 76 between each pair of coupling files, a minimum number of coupling drive systems have to be used.

The Power Train described below and seen in FIG. 9 intermittently rotates the conveyor drive sprocket shaft 69 by delivering intermittent periodic power pulses through chain 77 (FIG. 9) to the conveyor main sprocket 78. The coupling rotary system 73, 74, 75 is continuously driven by a separate but continuously operating drive train further described in FIG. 9, which delivers power to the coupling drive and idler sprockets.

Workpiece Loading and Unloading Means

Workpieces (preforms) are fed into and removed from the coupling by means which cooperate with cam 80 and 15 (or 315, FIGS. 14 and 15) respectively to move the various parts of each coupling in a timed manner between the FIGS. 4 and 5 (and 16, 17) positioned thereby to load and unload the coupling. The cycle of coupling positions for workpiece loading, conveying, and unloading is: (a) cam the coupling 12B (FIG. 1) to the release/load position of FIG. 5 or 17; (b) while in the FIGS. 5, 17 position and using the loadding means 8 (left side FIG. 1; FIG. 6) feed the workpiece 2 into the coupling until the seat 36 is pushed against the closed end 41 of the carrier or the preform engages seat 436; (c) at which time cam the coupling to the engage/hold position of FIG. 4 or 16; then advance the coupling horizontally while holding it vertically and twirling to the unload station 12E while keeping the coupling parts in the FIG. 4 or 16 position; (d) release the workpiece at the unload station 12E by moving the coupling to the FIG. 5 or 17 position; and then (e) return the coupling to the FIG. 4 or 16 position and move the coupling to the loading station.

The following description refers to places to FIGS. 4 and 5, it being understood that corresponding respective reference to similar or identical parts and functions of FIGS. 16, 17 is meant.

The unload/release structure and operation being the simpler of the two will be explained first and by reference to FIGS. 1, 3, 4, 5. The unload station 12E is at the right end of the conveyor in FIG. 1 and is reached when a coupling is moved to the position of coupling 12E at which position the coupling follower initiates contact with the release cam 15 as shown in FIG. 4. The release cam 15 is bolted or otherwise fixed to the horizontal frame plate 56 but is phantomed in FIG. 1 is avoid a cluttered drawing: See FIGS. 3–5. Rightward movement of the coupling 12E is interrupted and it dwells at 12E for a time interval sufficient for loading a preform 2B into the coupling 12B at the other end of the machine. The next advance of the coupling moves the follower 44 along the cam 15 until the cam release point is reached as seen in FIG. 5 which releases the preform 2E. The coupling continues to move during this advance until it is no longer in contact with the release cam and in fact moves the position of coupling 12F of FIG. 1; this continued advance allows the follower to move past the release cam 15 trailing edge and out of all contact with the release cam whereupon the follower spring 47 returns the now-empty coupling parts to the position illustrated in FIG. 4 — except 36 is down on ring 38 — for the coupling. The coupling parts remain in this hold/engage position until the coupling reaches the loading station at coupling 12B.

The conveyor chain 66 moves the coupling around the right end of the conveyor of FIG. 1 and along the horizontal track 62 at the top of the conveyor to ultimately move around the left end of the conveyor (as seen in FIG. 1) to the loading position designated as coupling 12B. Bracket 82 fixes the loading means 8 to the frame end plate 57. At the loading station or position, mechanisms shown in FIGS. 2, 6, 7 and 8 are used to manipulate the coupling, place a workpiece therein, and to engage and hold the workpiece.

As the coupling moves from position 12A to 12B (its parts in the hold/engage posture of FIG. 4) on its carrier bar around the left end of FIG. 1, the follower engages the rocker cam 80 shown in the partially cut away part of FIG. 6 and the coupling movement is interrupted when the coupling reaches position 12B. The rocker cam 80 has by this time depressed the follower so that the coupling parts assume the load posture of FIG. 5.

The conveyor system in FIG. 1 is driven intermittently so that the coupling is held still (hence all couplings are held still temporarily) at the loading position 12B of FIGS. 1 and 6 for a time sufficient to load a workpiece 2B therein. As soon as the preform (workpiece) is fed into the coupling, the rocker cam 80 is oscillated clockwise to free itself of contact with the follower 44 which allows the coupling to spring back to the hold (FIG. 4) position, which means the detents grab the preform.

The rocker cam is mounted on a rocker shaft 88 (as are a plurality of like cams) and is manipulated by the linkage illustrated in FIG. 8 (and see FIGS. 2, 6) which operates off a face cam 84 which is bolted as a matter of convenience to the back face of one of a pair of feeder face cams 85, 86 and is mounted to rotate in unison therewith on the housing 86 of ball bearing assembly 87 on shaft 70. All of the face cams 84, 85 are driven by power received from chains 88 at sprockets 89 which latter are likewise bolted or otherwise fixedly secured to their respective ball bearing assemblies 87 and which in turn receive their motive power through the continuous drive train further illustrated in FIG. 9.

Anyhow, the rocker face cam 84 is engaged by a follower 91 (FIGS. 6, 8) located intermediate of the ends of the follower arm 92 one end of which is mounted to pivot from the frame about 93 and has a clevis connection 94 at the other end to a horizontal linkage 95, 96, 97 (FIG. 8) which transmits and amplifies the motion of the cam follower 91 to the crank 98 of the rocker cam shaft 83 in such fashion that the rocker cam 80 is moved out of contact with the coupling to permit the coupling to assume the FIG. 4 position after which the rocker cam 80 is returned to a position where it can depress the coupling follower of the next succeeding coupling.

The FIG. 8 linkage (also FIGS. 2, 6, 7) includes first and second push rods 95, 97 which are connected by conventional pin or clevis joints 101, 102 to a horizontal lever 96 that is pivotally supported by bearing 103 from the horizontal frame plate. The cam and entire FIG. 8 linkage are shaped to hold the rocker cam in the FIG. 6 solid line position for a time sufficient to allow loading of a preform into the coupling (by holding the latter in the FIG. 5 position as noted above) then to snap the coupling to the hold position of FIG. 4 by rocking the cam clockwise out of contact with the coupling follower to the position shown in FIG. 6 ghost lines after which the rocker cam is held in the out of contact position until after the conveyor 10 has moved the coupling away from position 12B. The rocker cam is then rocked back to the contact solid line position. The next periodic motion of the conveyor means moves the coupling from the loading position, replaces it with another, and preferably brings each coupling to approximately the position 12C where it initially engages the double width chain and starts rotating.

The loading means 8 of FIGS. 6 and 7 is a loader face cam 85 operated feeding means for feeding one workpiece at a time from the loading chute 105 into couplings presented one by one at the loading position designated as coupling 12B, (actually four into four when the four abreast array of FIGS. 1-3 is used) in a predetermined time relationship with the conveyor operation. Thus the machine includes a timing system (the face cams 84, 85 and the conveyor intermittant drive 189 of FIG. 9 infra) that operates the feeding means which the conveyor i.e. the several couplings is/are held still. As best seen in FIG. 2, there is one face cam on each end of shaft 70 and the ball bearing assemblies 86, 87 permits relative rotary motion between the shaft 70 and each face cam unit 84-87 or 85-87. The loader face cams are shaped to cooperate with the rocker cam by feeding a preform into the coupling and holding the preform there until after the rocker cam 80 has been moved to cause the coupling at 12B to grasp or hold the workpiece and then to return the feed means to the FIG. 6 solid line or starting position until the next succeeding coupling is presented at position 12B.

A support bracket 82 (FIGS. 1, 6) holds the loading means 8 in place. The means 8 causes the preforms to be gravity fed by chute 108 to the position designated as preform 2B from whence it is axially moved by a lifter assembly 106 into the coupling as aforesaid.

The loading chute of FIGS. 6 and 7 comprises a sloping pair of upper tracks 108 which the support ring 18 of the preform engages and stop 109 on the end of track to exactly position the preform relative to the coupling. Lateral positioning of the preform is maintained by a pair of lower tracks 110 which engage the preform or workpiece at any convenient location intermediate of the ends of the workpiece. The upper and lower tracks are supported by vertical bracket arm 111 which are bolted or otherwise secured to the workpiece support brackets 82 and bracket plate 112. (FIGS. 1 and 6).

The lifter assembly 106 (FIGS. 6, 7) comprises side support members 115 containing straight internal guide tracks 116, a cross bar 117 pivotally connected by clevis joints 118 near each end to one of the follower rods 119 depending from one of the feeder face cams 85, and a plurality of rollers 120 at each end that support the bar from the guide plates. A plurality of individual resilient workpiece feeder assemblies 122 is mounted on the bar, one for each file of couplings. (Only one such feeder assembly will be described the remainder being identical therewith). Each feeder has a base plate 123 secured to the cross bar 117 by a plurality of bolts 125. The slot 124 allows adjusting same to accomodate different lengths of preforms or workpieces. On the outboard end of this support is secured a cap 126 which is shaped like U or channel to receive the end of the workpiece in the manner illustrated in FIGS. 6 and 7 to be capable of engaging and positioning the forward and lateral surfaces of the workpiece.

A foot 127 is slidably supported on a peg 128 and is resiliently biased away from the peg by a spring 129 so that preforms of slightly different lengths can still be fed and firmly positioned within the couplings. Ears 131 on the cap provide lateral and axial support and stops to the foot 127.

Each feeder face cam 85 is engaged by a follower 130 positioned centrally in a follower arm 135 which pivots about a fixed pivot 132 and has a free or swinging end 133 which pivotally connects a follower rod which as shown in FIGS. 6 and 7 is connected to the cross bar 117. A spacer 136 supports the pivot 132 a suitable distance from side frame 55. The face cams 85 are shaped to lift the preform and feed it axially into the coupling, dwell there until the rocker cam has moved the coupling to its hold position of FIG. 4, and then retract and repeat in timed relation to other events and while the coupling is stopped at 12B.

Power Train

FIG. 9 shows a preferred power train for the instant invention. Two prime movers in the form of electric motors 140, 141 are provided. Motor 141 drives a horizontal chain 143 which is lead around a number of idlers 144, 145 and is used to drive the coupling rotating primary gears 146, 147 which are supported by bearings 148, 149 from plate 56 on the same shafts 150, 151 which support sprockets 74.

Motor 140 is actually a gear motor and uses both ends of one output shaft or two output shafts 160, 161 so that the drive train is divided into two parts, a continuously rotating system off shaft 160 and the stop-and-go or intermittant preform advance drive off 161. The gear motor 140 is mounted preferably on top of the conveyor system as schematically illustrated in FIG. 1. Its continuous drive system is taken off shaft 160 and connected by line shafting, bevel gears 162, timing shaft 164, timing sprockets 166, timing chain 88, and sprockets 89 to drive continuously the loading system face cams 84, 85.

The intermittant drive system passes through an indexing means such as a magnetic clutch or geneva wheel 189 to a sprocket 191 that drives chain 77 that drives the main sprocket 78 and shaft 69 to thereby intermittently advance the conveyor system 10 and therefore the carrier bars 20 and couplings 12.

During operation of the system both motors 140, 141 operate continuously. The system driven by motor 140 operates as above described. The system driven by motor 141 operates continuously to thereby continuously rotate the couplings hence to continuously rotate the preforms.

Method of Loading, Conveying, and Unloading

The method of loading a workpiece 2B into a coupling 12B, conveying it along a path to an unloading station 12E and there releasing it comprises the steps of providing a coupling 12 for holding the workpiece 2 which comprises a generally cup-shaped support member 25 revolvably mounted on a linearly movable conveyor means 20, a cup-shaped carrier member 26 slidably mounted for axial movement within said support member and detent means 35 carried by said carrier and operable to move radially responsive to relative axial motions between said carrier and support members; moving the coupling to and arresting motion at a loading station 2B; feeding a workpiece 2B axially thereof into the coupling; moving the detents 35 radially inward to grasp the workpiece responsive to the aforesaid axial motion; conveying said coupling and workpiece by intermittent periodic increments of advancement toward the unloading station 12E; and releasing said workpiece by causing said detents to move radially away from said workpiece responsive to movement to the unloading station. The invention also includes the combination of this method and the step of continuously rotating the coupling during a major portion of the time the coupling with workpiece therein is being intermittently advanced from the leading station 12B toward unloading station 12E. The method can also embrace using a plurality of equally spaced couplings 12 in an array of couplings arranged in rank and file manner (note FIGS. 1-3) whereby a plurality of said couplings may be simultaneously loaded (in the manner described for FIGS. 6, 7) and unloaded.

Modified Pressure Plate

FIGS. 10, 11, 12 and 13 show a preferred version of the pressure plate which is characterized by having a modified pressure plate 76a with a spring loaded nose assembly 276 which provides a smooth entrance or lead-in section for getting the teeth on the coupling sprockets 51 engaged with the lower links on chains 73. Advantages of this construction include significant reduction in breakage and other malfunctions of chain 73 under operating conditions: such breakages occur from sprocket teeth jamming on the chain rollers.

As with the original pressure plate 76, the nose assembly 276 can be and preferably is suspended by lugs 278 from channel iron 279. The channel is secured by appropriate means such as bolts or welding (not shown) to the horizontal plate 56 and the lugs are in turn secured by bolts (not shown) or by welding.

Nose assembly 276 essentially is a pair of spring loaded chain leads 280, 281 which are mounted on a modified end 76b of the modified pressure plate 76a, within one of the endless loops comprising chain 73 with the leads in each pair supported to engage the rollers but not the links on the chain 73. A spring 282 biases the leads outwardly against the chain. Each lead is pivoted about its respective axis (preferably a bolt) 284, 285.

The pressure plate end 76b is cut to a certain configuration to allow (FIG. 11) clearances 286, 287 which permit inward motion of each lead and to limit by lugs 288, 289 the outward motion of each lead about said axis.

The chain leads are actually mounted between upper and lower mounting plates 290, 291 which are secured by bolts 292 or other means to the end 76b and in which the bolts 284, 285 are mounted.

The spring 282 is held in compression between the leads, thereby urging them outward but permitting resilient resistance to inward motion which may occur in random fashion when the sprocket teeth, chain rollers, and lead are mutually engaging each other. The spring is held in place by a sheet metal clip 294 having a J-shaped cross section which is secured by screws 295 to the end 76b.

As best seen in FIG. 12 leads 280, 281 are respectively (and each) provided with an outer engaging bead 298, 299 that is narrow enough to easily fit between the lengths of chain 73 thereby to insure that only the chain rollers and not the side links are engaged by the entrance or leading edge of each chain lead. The main body of each chain lead may be made substantially thicker than the roller of the chain, thereby providing strength and adequate bearing surface at its axis 284 or 285. However, the entrance beads 298, 299 may be formed as by milling or grinding to a thickness less than the roller would thereby to insure engagement only of the rollers and not of the side links. As seen in FIG. 11 this entrance bead is tapered so that by the time the chain roller and coupling sprockets reach its widest point a smooth engagement of the chain and sprocket have been achieved. The bead can optionally be continued on the pressure plate main body 76a.

Pneumatic Release Cam Assembly 315

FIGS. 14 and 15 show this feature which in essence provides a pneumatic air cylinder 316 tp release each workpiece that the coupling brings to station 2E, 12E. Speaking generally, when the presence of the stopped workpiece at station 2E is detected (through a suitable means contact switch, photocell operation etc.) air is admitted through a control valve 330 into air line 317 thence into cylinder 316, thereby extending the plunger 318 which protrudes therefrom which in turn strikes the follower 44 on the coupling 12E and drives the same down at least until the detents release the workpiece 2E.

The air cylinder 316 and associated structure of assembly 315 fit completely and in place of each of the cams 15 previously described. These air cylinders are preferred because all four of them can be operated at once with a stroke long enough as to each file of couplings regardless of minor difference in mechanical stroke, alignment, etc. to insure thereby releasing four preforms simultaneously. The simultaneous release is important because all have to be blow molded simultaneously on a very rapid cycle.

The release assembly 315 compensates for differences in stroke required and in lateral or cross machine alignment as the couplings and workpieces. Machine wear resulting in chain stretch, thermal warpage, wear on coupling parts, etc. render the pneumatic cylinder version of FIGS. 1 and 3-5 preferable although operating experience to date indicates that the release cam 15 serves for a considerable period of time before requiring realignment of the various machine parts or the adoption of a different means to achieve simultaneous release.

Each cylinder 316 is provided with a suitable manifold 317 including an air (or other compressed gas) line. Preferably, this is compressed air. Air admission and cut off is controlled by a valve 330 in each manifold. It is also preferred to supply the compressed air into that of any adjacent blow molding operation. The air cylinder and its piston are conventional commercially available items.

Each air cylinder is secured by suitable means such as bolts to a mounting block 320 which in turn is secured by welding or bolts to plate 56. The piston plunger 318 extends into one end of a sleeve or rigid coupling 321 to the other end of which coupling is secured a circular steel pad or button 322. Coupling 321 is slidably supported within block 320. Coupling 321 has internal threads 323 that engages corresponding threads on the plunger 318 and on a threaded stem 324 on the button. When air is admitted to the cylinder 316 the plunger 318 extends and the button 322 hits the follower 44 of whatever coupling 12 is presented at station 12E. The plunger continues to drive outwardly until no further motion by the follower 44 is possible by which time the workpiece 2E has been released, the air has been cut off, and the plunger is then allowed to return. The cylinder can be either single or preferably, double acting but if the former a spring return or something equivilent must be provided.

The mounting blocks 320 are secured by suitable means such as bolts to the horizontal plate 56.

What is claimed is:

1. An improved coupling assembly for use in combination with a conveyor means to form a machine that carries hollow workpieces between a workpiece loading station and a workpiece unloading station and then returns to the former, which machine further includes conveyor means movably mounted relative to the base of said machine for supporting at least one such coupling for repeated movement along respective first and second paths to and away from said respective stations for loading and unloading and wherein said improved coupling comprises (a) a carrier that is a part of said conveyor means;
    (b) a support member having an upper stem portion and a lower portion, said upper portion being mounted on said carrier to revolve but not reciprocate relative to said carrier, said lower portion having internal shoulder means surrounded by a cup-shaped structure, the cup being defined by an annular wall surrounding a chamber and an end wall supporting at least a part of said internal shoulder means and connecting said stem portion to said annular wall and having an open end on the bottom of said cup opposite said end wall;
    (c) a follower slidably supported in said stem portion and having the lower end of said follower substantially within said chamber, said follower being movable axially toward and away from said open end; and
    (d) detent means comprising a resilient ring supported for compression between said follower lower end and said support member internal shoulder means and radially resiliently movable, respectively, in and out from the central portion of said chamber responsive to decompression and compression, respectively, from axial movement of said follower to respectively disengage and engage an internal annular portion of such workpiece.

2. An improved coupling for use in combination with a conveyor means according to claim 1, which further includes a follower biasing means to urge same away from said open end.

3. A coupling according to claim 1 wherein said resilient ring is an elastomeric ring.

4. A coupling according to claim 1 wherein said resilient ring is an elastomeric ring and which further includes a follower biasing means to urge same away from said open end.

5. An improved machine that is a combination of a conveyor means and a plurality of couplings each for handling an elongated hollow workpiece by carrying same while twirling between a workpiece loading station and a workpiece unloading station and return, which machine further includes conveyor means movably mounted relative to the base of said machine for supporting a plurality of said couplings for repeated movement along respective first and second paths to and away from said respective stations for loading and unloading means to cause each coupling to engage and disengage a workpiece responsive to arriving, respectively, at said loading and unloading stations; and conveyor drive means that alternately and periodically interrupts movement of said conveyor between said stations while twirling continuously those couplings being moved from said loading to said unloading station; and wherein more than one of said couplings comprises (a) a carrier means that is a part of said conveyor means;
    (b) a support member mounted on said carrier and having an upper stem portion and a lower portion, said upper portion being mounted on said carrier to revolve but not reciprocate relative to said carrier, said lower portion having internal shoulder means surrounded by a cup-shaped structure defined by an annular wall surrounding a chamber, the cup being formed further by an end wall supporting said internal shoulder means within said chamber and connecting said stem to said side wall and having an open end opposite said end wall;
    (c) a follower slidably supported in said stem portion and having the lower end of said follower substantially within said chamber said follower being movable axially toward and away from said open end;
    (d) a detent means that includes a resilient ring supported between said follower lower end and said support member internal shoulder means and radially movable, respectively, in and out from the central portion of said chamber responsive to decompression and compression, respectively, from axial movement of said follower to engage an internal annular portion of such workpiece.

6. An improved machine according to claim 5, wherein each coupling has a means to resiliently bias same to a position for engaging a workpiece, and said conveyor means has a plurality of said carriers that supports said couplings in rank and file position.

7. An improved machine according to claim 5, wherein said resilient ring is an elastomeric ring.

8. An improved machine according to claim 5, which further includes a follower biasing means to urge same away from said open end.

9. An improved machine according to claim 8, wherein each coupling has a means to resiliently bias same to a position for engaging a workpiece, and said conveyor means has a plurality of said carriers that supports said couplings in rank and file position.

10. An improved machine that is a combination of a conveyor means and a plurality of couplings each for handling an elongated hollow workpiece by carrying same in a substantially vertical position while twirling between a workpiece loading station and a workpiece unloading station and return, which machine further includes conveyor means movably mounted relative to the base of said machine for supporting a plurality of said couplings for repeated movement along respective first and second paths to and away from said respective stations for loading and unloading means to cause each coupling to engage and disengage a workpiece responsive to arriving, respectively, at said loading and unloading stations; and conveyor drive means that alternately and periodically interrupts movement of said conveyor between said stations while twirling continuously those couplings being moved from said loading to said unloading station; and wherein said couplings each comprises (a) a carrier means that is a part of said conveyor means;

(b) at least one support member mounted on said carrier and having an upper stem portion and a lower portion, said upper portion being mounted on said carrier to revolve but not reciprocate relative to said carrier, said lower portion being cup-shaped, the cup being defined by an annular wall surrounding a chamber, the cup being formed further by an end wall connecting said stem to said side wall and having an open end opposite said end wall;

(c) a follower slidably supported in said stem portion and having the lower end of said follower within said chamber said follower being movable axially toward and away from said open end;

(d) an elastomeric ring supported between said follower lower end and said support member and radially movable, respectively, in and out from the central portion of said chamber responsive to decompression and compression, respectively, from axial movement of said follower to engage an internal annular portion of such workpiece.

11. An improved coupling assembly for use in combination with a conveyor means to form a machine that carries hollow workpiece between a workpiece loading station and a workpiece unloading station and then returns to the former, which machine further includes conveyor means movably mounted relative to the base of said machine for supporting at least one such coupling for repeated movement along respective first and second paths to and away from said respective stations for loading and unloading and wherein said improved coupling comprises (a) a carrier that is a part of said conveyor means;

(b) a support member having an upper stem portion and a lower portion, said upper portion being mounted on said carrier to revolve but not reciprocate relative to said carrier, said lower portion having internal shoulder means surrounded by a cup-shaped structure, the cup being defined by an annular wall surrounding a chamber and an end wall supporting at least a part of said internal shoulder means and connecting said stem portion to said annular wall and having an open end on the bottom of said cup opposite said end wall;

(c) a follower slidably supported in said stem portion and having the lower end of said follower substantially within said chamber, said follower being movable axially toward and away from said open end;

(d) detent means supported on one of the lower end of said follower and from said cup annular wall and being substantially radially movable to positions for holding and disengaging such a workpiece responsive to axial movement of the lower end of said follower, respectively, away from said cup end wall and toward said cup open end and vice versa; and (e) a follower biasing means to urge said follower in a direction away from said cup open end.

* * * * *